United States Patent
Clements et al.

(10) Patent No.: US 6,648,350 B1
(45) Date of Patent: Nov. 18, 2003

(54) SUSPENSION SYSTEM FOR A VEHICLE HAVING A VEHICLE STABILIZER BAR WITH INTEGRAL END LINKS

(75) Inventors: Mark Clements, Lapeer, MI (US); Joe Fader, Brighton, MI (US); Chris Keeney, Troy, MI (US); Steve Yollick, Troy, MI (US); Jim Hawkins, Cookeville, TN (US)

(73) Assignee: Meritor Light Vehicle Systems, Inc., Troy, MI (US)

(*) Notice: Subject to any disclaimer, the term of this patent is extended or adjusted under 35 U.S.C. 154(b) by 0 days.

(21) Appl. No.: 09/567,457

(22) Filed: May 8, 2000

(51) Int. Cl.[7] ................................................ B60G 21/05
(52) U.S. Cl. ........................ 280/124.106; 280/124.152; 280/93.511
(58) Field of Search ................ 280/124.106, 124.13, 280/124.137, 124.149, 124.152, 93.502, 93.507, 93.508, 93.51, 93.511

(56) References Cited

U.S. PATENT DOCUMENTS

| | | | |
|---|---|---|---|
| 3,033,587 A | | 5/1962 | Perish |
| 3,549,167 A | * | 12/1970 | Haverbeck ........... 280/124.134 |
| 3,740,986 A | | 6/1973 | Schmid |
| 3,950,006 A | * | 4/1976 | Wood, Jr. ............... 280/93.511 |
| 4,162,859 A | * | 7/1979 | McAfee ........................ 403/75 |
| 4,875,703 A | * | 10/1989 | Murakami ................... 280/665 |
| 4,883,287 A | | 11/1989 | Murakami et al. |
| 5,011,321 A | | 4/1991 | Kidokoro |
| 5,165,306 A | | 11/1992 | Hellon |
| 5,387,004 A | | 2/1995 | Engel |
| 5,807,010 A | | 9/1998 | Parker et al. |
| 5,954,353 A | * | 9/1999 | Kincaid et al. ....... 280/124.152 |

FOREIGN PATENT DOCUMENTS

| | | |
|---|---|---|
| DE | 44 43 809 A | 4/1996 |
| EP | 0 775 603 A | 5/1997 |
| GB | 1387 650 A | 3/1975 |
| JP | 01 062243 A | 3/1989 |
| JP | 01 182109 A | 7/1989 |
| JP | 06 055237 A | 3/1994 |
| JP | 09 177762 A | 7/1997 |
| JP | 63 072447 A | 4/1998 |
| WO | WO 98 19873 A | 5/1998 |

* cited by examiner

Primary Examiner—Paul N. Dickson
Assistant Examiner—Faye M. Fleming
(74) Attorney, Agent, or Firm—Carlson, Gaskey & Olds

(57) ABSTRACT

A suspension system includes a stabilizer bar having an integral ball link directly formed as each end of the stabilizer bar. Because the ball link is integral to the stabilizer bar, there are no bolts, nuts or other fasteners that limit the articulation of the end link relative to the stabilizer bar. The present invention thereby provides greater end link articulation and improved suspension system performance.

8 Claims, 1 Drawing Sheet

SUSPENSION SYSTEM FOR A VEHICLE HAVING A VEHICLE STABILIZER BAR WITH INTEGRAL END LINKS

BACKGROUND OF THE INVENTION

The present invention relates to a suspension system for a vehicle, and more specifically to a stabilizer bar having an integral ball link.

Vehicles are commonly equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle.

Typically, the stabilizer bar is a rod-shaped member oriented to extend laterally across the vehicle and an arm segment extending longitudinally at each end of the central segment. The central segment of the stabilizer bar is supported for rotation about its own longitudinal axis by one or more mounting brackets which are fixed to the vehicle body or frame. The distal end of each arm segment is coupled to a control arm of the suspension system by an end link.

When the vehicle is subjected to a lateral rolling force such as, for example, while the vehicle negotiates a turn, the arm segments pivot in opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar.

As noted, each end of the stabilizer bar is typically attached to a corresponding control arm by an end link. One type of known stabilizer bar end link includes a connector at each end extending at right angles to the longitudinal axis of the link itself. The connectors attach to corresponding ball studs on the stabilizer bar and a vehicle frame component. Ball studs are preferred as they permit a rather large area of movement. The area of movement provided by the ball link is definable as a conical area. The ball studs are commonly manufactured as one-piece units which are attached to the stabilizer bar and vehicle frame by a fastener such as a bolt. However, these fasteners can interfere with movement of the connectors and reduce end link articulation thereby reducing the conical area. Disadvantageously, this reduced end link articulation limits the overall suspension system articulation. Further, because the ball studs are typically manufactured independently and are fastened to the stabilizer bar, multiple machine operations are necessary and substantial weight is added to the suspension system.

SUMMARY OF THE INVENTION

The suspension system according to the present invention provides a stabilizer bar having an integral ball link directly formed as each end of the stabilizer bar. Because the ball link is integral to the stabilizer bar, there are no bolts, nuts or other fasteners that limit the articulation of the end link relative to the stabilizer bar. The present invention thereby provides greater end link articulation and improved suspension system performance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
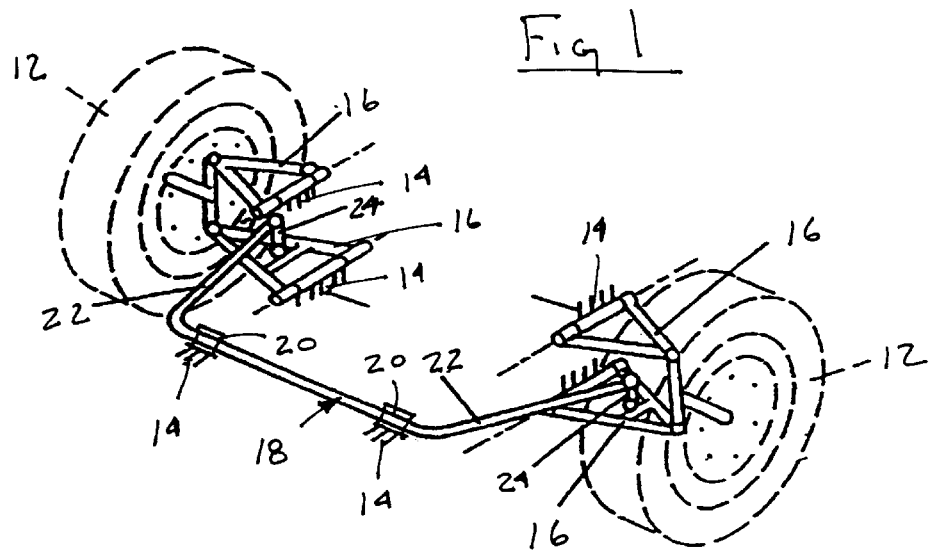
FIG. 1 is a general phantom view of a vehicle illustrating a suspension system.

FIG. 1 illustrates a schematic perspective view of a vehicle suspension system 10. In the disclosed embodiment, a double transverse link suspension system is illustrated wherein two vehicle wheels 12, are each articulatably connected to a vehicle chassis (schematically indicated at 14) by transverse links 16. A stabilizer bar 18 is movably supported at a mounting bracket 20 from the vehicle chassis 14 in a conventional manner. The stabilizer bar 18 includes two arms 22 extending substantially lengthwise of the vehicle. The arms 22 are articulatably joined to the lower transverse link 16 on each side by an end link 24.

Figure 2:
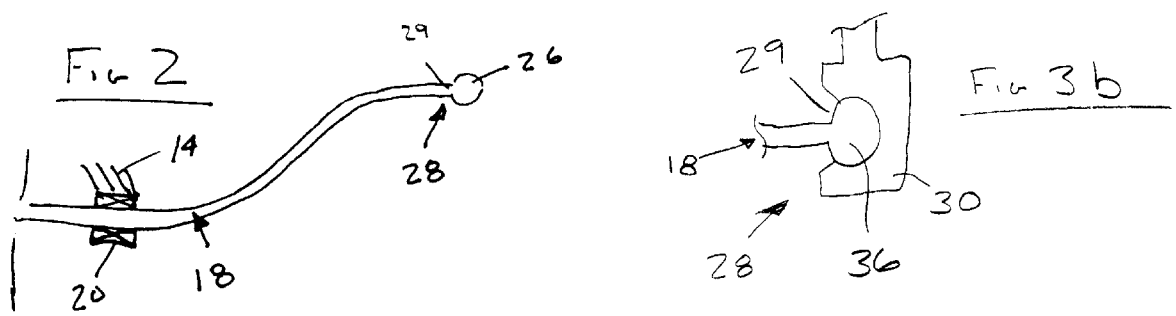
FIG. 2 is an expanded view of a stabilizer bar having an integral ball link according to the present invention.

Referring to FIG. 2, a top view of the stabilizer bar 18 according to the present invention is illustrated. The stabilizer bar 18 includes a ball link 26 directly formed as each end 28 of the stabilizer bar 18. The stabilizer bar 18 is supported by a mounting bracket 20 to the vehicle chassis 14. Although, only one half of the stabilizer bar is illustrated, it should be understood that both ends of the stabilizer bar include the ball link 26. The ball link 26 is preferably manufactured integral to the stabilizer bar by such methods as machining, rotary swaging, rotary forming or the like. The ball link 26 may also be separately manufactured and attached to the stabilizer bar 18 by friction welding, complimentary threads, or the like. Stated another way, the area 29 inward of ball is of a smaller outer diameter than the ball 26 throughout the length of bar 18 which could interfere with its mounting structure.

Figure 3B:
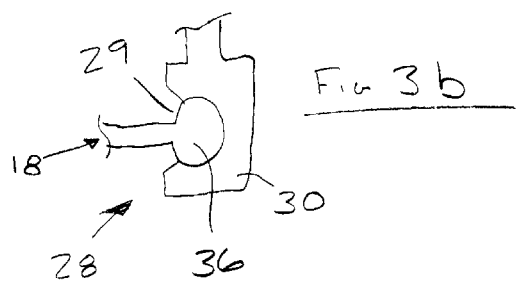
FIG. 3B shows one feature of the FIG. 3A construction.
Figure 3A:
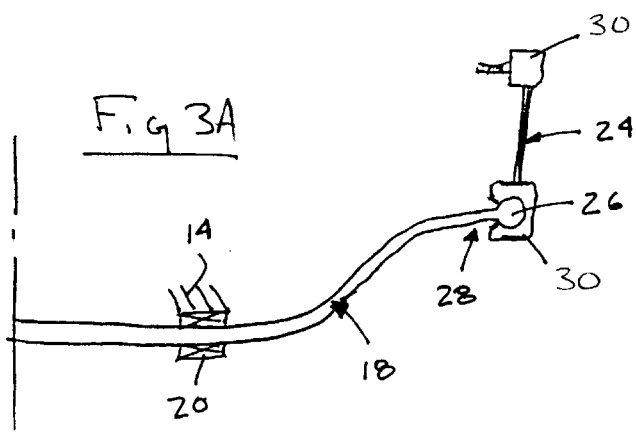
FIG. 3A is an expanded view of the stabilizer bar of FIG. 2 attached to an end link.

FIG. 3A, illustrates the stabilizer bar 18 attached to the end link 24 by a connector 30. Because the ball link 26 is integral to the stabilizer bar 18, an inner area 29 is formed. The inner area 29 is devoid of bolts, nuts or other fasteners that would otherwise interfere with connector 30 and limit articulation of the end link 24 relative to the stabilizer bar 18.

As shown in FIG. 3B, the bar 18 and ball 26 are movable within connector 30. The inner area 29 is smaller than ball 26 such that the bar 18 can move freely within connector 30. It should be understood that inner area 29 can have a diameter greater or less than said stabilizer bar 18, as long as it does not interfere with articulation of the connector 30 and ball 26. The present invention thereby provides greater end link 24 articulation and improved suspension system performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A suspension system for a vehicle comprising:

a suspension member;

an end link attachable to said suspension member, said end link having a ball socket; and a solid stabilizer bar having a solid ball link fittable into said ball socket, said solid ball link being integrally formed as an end of, and as a continuous portion of said stabilizer bar to define a fastener-free inner area immediately adjacent said solid ball link for unobstructed articulation of said ball socket within and through said inner area, said inner area defined immediately adjacent said solid ball link between the stabilizer bar outer diameter and the outer diameter of the solid ball link.

2. The suspension system as recited in claim 1, wherein said inner area is devoid of fasteners between said solid ball link and said stabilizer bar.

3. The suspension system as recited in claim 1, wherein said solid ball link is machined onto said end of said stabilizer bar.

4. The suspension system as recited in claim 1, wherein said solid ball link is rotary swaged onto said end of said stabilizer bar.

5. The suspension system as recited in claim 1, wherein said solid ball link is rotary formed onto said end of said stabilizer bar.

6. A method of increasing articulation of a vehicle suspension system having a stabilizer bar and an end link comprising the steps of:

(1) integrally forming a solid ball link upon an end of a solid stabilizer bar as a continuous portion of the solid stabilizer bar to form a fastener-free inner area immediately adjacent said ball link between the solid stabilizer bar outer diameter and the outer diameter of the ball link; and (2) fitting said ball link into a female socket attached to an end link such that said female socket is articulatable within and through said inner area for unobstructed articulation of said solid stabilizer bar relative to said end link.

7. A method of increasing articulation of a vehicle suspension system having a stabilizer bar and an end link comprising the steps of:

(3) machining a solid ball link upon an end of a solid stabilizer bar to form a fastener-free inner area immediately adjacent said ball link between the stabilizer bar outer diameter and the outer diameter of the ball link; and (4) fitting said ball link into a female socket attached to an end link such that said female socket is articulatable within and through said inner area for unobstructed articulation of said stabilizer bar relative to said end link.

8. A method of increasing articulation of a vehicle suspension system having a stabilizer bar and an end link comprising the steps of:

(5) rotary swaging a solid ball link upon an end of a solid stabilizer bar to form a fastener-free inner area immediately adjacent said ball link between the stabilizer bar outer diameter and the outer diameter of the ball link; and (6) fitting said ball link into a female socket attached to an end link such that said female socket is articulatable within and through said inner area for unobstructed articulation of said stabilizer bar relative to said end link.

* * * * *

UNITED STATES PATENT AND TRADEMARK OFFICE
CERTIFICATE OF CORRECTION

PATENT NO.    : 6,648,350 B1                                       Page 1 of 1
DATED         : November 18, 2003
INVENTOR(S)   : Clements et al.

It is certified that error appears in the above-identified patent and that said Letters Patent is hereby corrected as shown below:

<u>Title page,</u>
Please change the inventors to read as the following:
-- [75] Inventors: Mark Clements, Lapeer, MI (US); Joe Fader, Brighton, MI (US); Chris Keeney, Troy, MI (US); Steve Yollick, Troy, MI (US); Jim Hawkins, Madison, AL (US) --

Signed and Sealed this

Second Day of March, 2004

JON W. DUDAS
*Acting Director of the United States Patent and Trademark Office*